Oct. 29, 1963     F. G. LAMB ET AL     3,108,625
FEED MECHANISM FOR HYDRAULIC CUTTER ASSEMBLY
Filed April 13, 1962     4 Sheets-Sheet 3
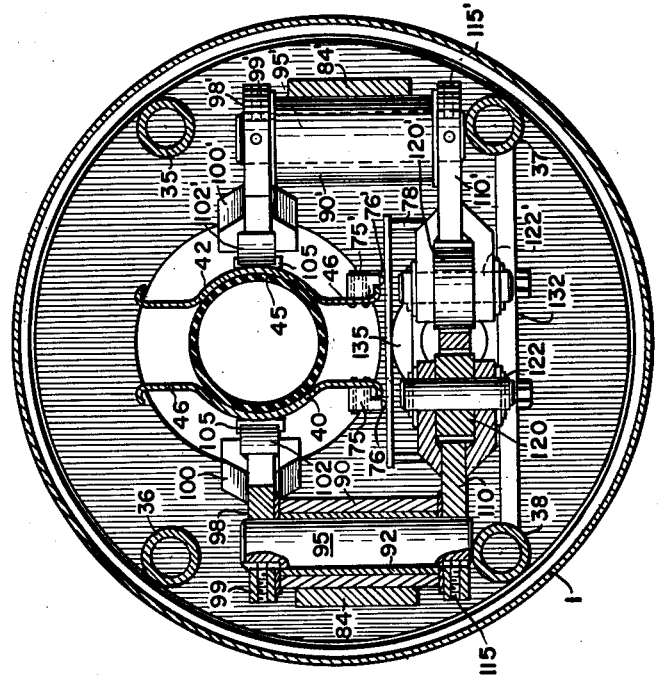
INVENTORS
Frank G. Lamb &
James E. Howard
ATTORNEYS Oct. 29, 1963　　F. G. LAMB ET AL　　3,108,625
FEED MECHANISM FOR HYDRAULIC CUTTER ASSEMBLY
Filed April 13, 1962　　4 Sheets-Sheet 4

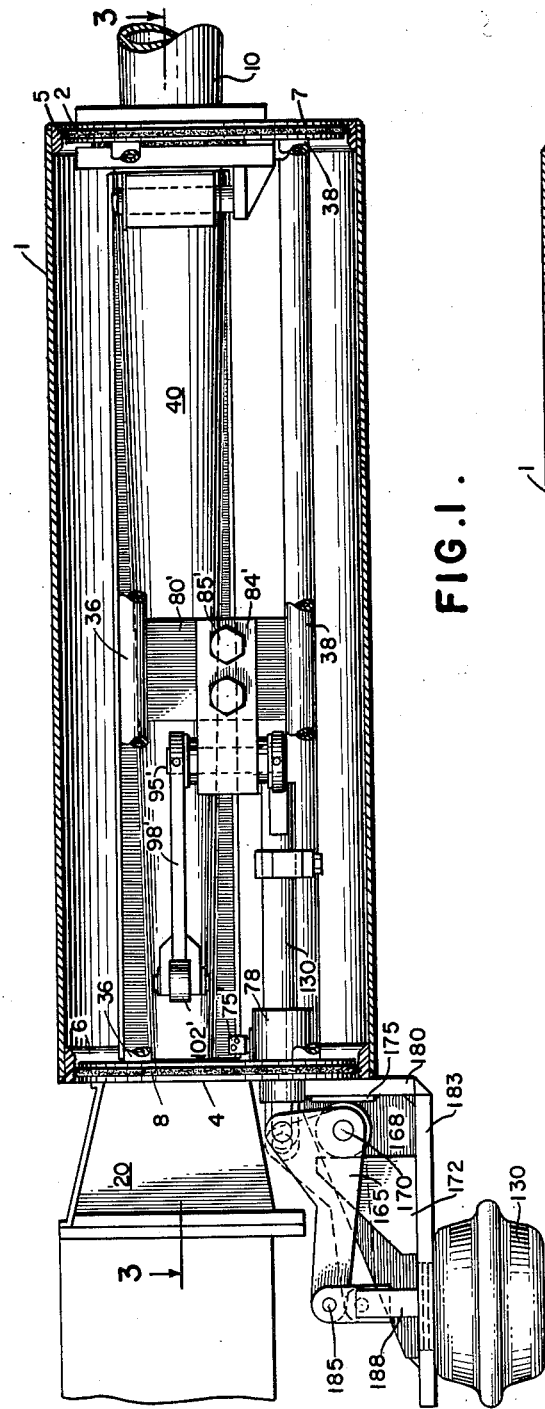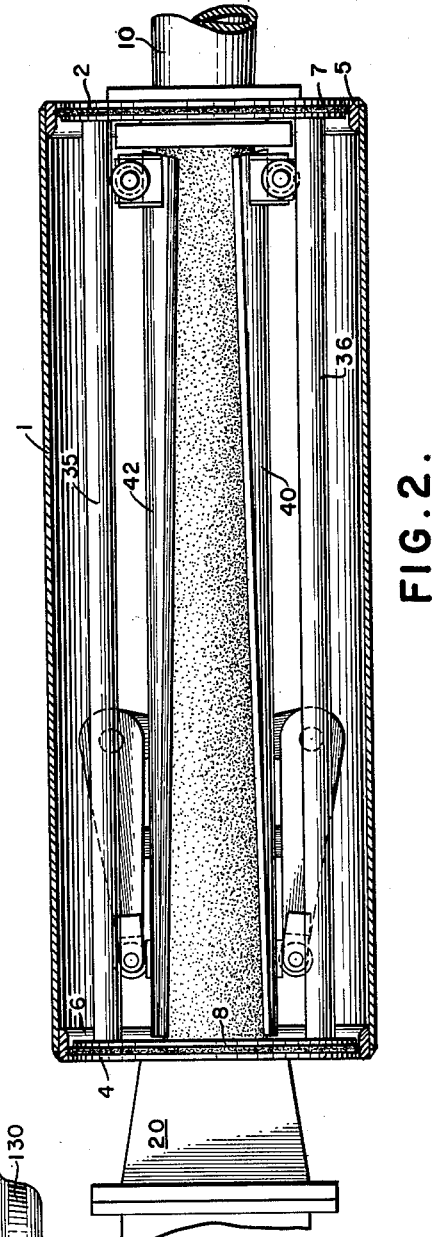

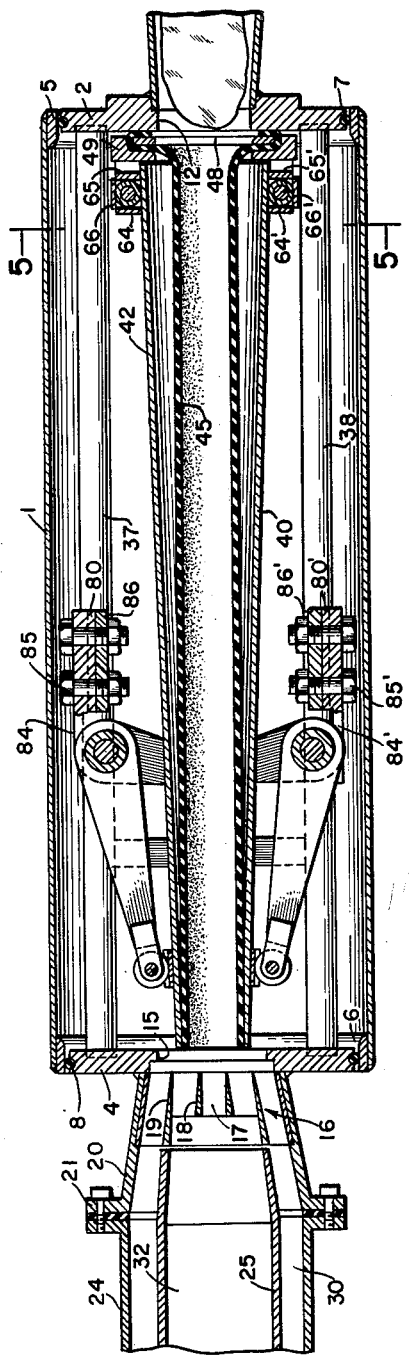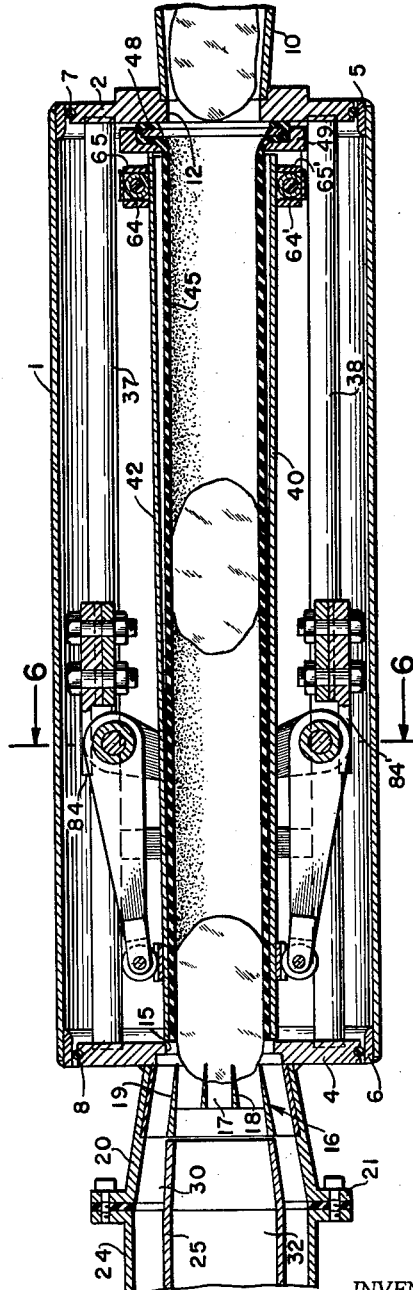

INVENTORS
Frank G. Lamb &
James E. Howard

BY *Thomas, Weisman & Russell*

ATTORNEYS

United States Patent Office 3,108,625
Patented Oct. 29, 1963

3,108,625
FEED MECHANISM FOR HYDRAULIC
CUTTER ASSEMBLY
Frank G. Lamb, American Falls, and James E. Howard, Pocatello, Idaho, assignors to Lamb-Weston, Inc., Weston, Oreg., a corporation of Oregon
Filed Apr. 13, 1962, Ser. No. 187,246
13 Claims. (Cl. 146—162)

This invention relates to an improved hydraulic feed for a system by which materials such as raw potatoes are rapidly and precisely fed through an appropriate cutting mechanism and whereby the product, for example a potato, is segmented into a number of so-called center cuts, while at the same time the exterior or outer slab portions thereof are removed from the more desirable center cut portions.

More particularly, the instant invention represents an improvement in the mechanism set forth in the copending application of Frank G. Lamb and Arthur R. Davidson filed February 24, 1961, Serial No. 91,444. In this copending application a complete and continuous system is described wherein the following sequential steps form the novel combination: raw potatoes are fed to an appropriate supply tank which is filled with hydraulic fluid such as water, the same representing a returned or recycled hydraulic feed. A food pump picks up the potatoes with water, feeds same to a product accelerator whereby individual potatoes are separated one from the other and then jets each potato through an appropriate cutter assembly. The latter is provided with alignment or guide shoes positioned anteriorly of the cutter device, and so arranged as to exactly center each potato along the longitudinal center of flow, so that each potato is correspondingly fed directly into the cutter mechanism. The latter is also described in detail in the said application.

After cutting the center pieces are separated from the slab portions of the potato by suitable separating mechanism, as also disclosed in the referred to disclosure. After separation the slabs are fed to one side of a dewatering trough and the center portions to the other side of same, the dewatering trough separating the respective potato portions from the water. The latter is then recycled to the supply tank for reuse as new charges of the product are continuously fed thereto.

The instant invention has particular reference to the primary operation of such an assembly—the alignment and centering of the product immediately preceding impingement thereof on the blades of the cutter, and without by-pass or loss of any of the available fluid pressure. As described in the aforesaid disclosure such centering devices are equalized in the sense that each side thereof moves in the same proportion and in the same amount as the opposite side thereof. Centering of fluid flow, and of the product, is thus accomplished.

Although the operation of the invention as set forth in the aforesaid disclosure has been extremely satisfactory and performs more efficiently for its designed purpose than any other system heretofore known, experience has shown that the maximum of thrust or kinetic energy of the hydraulic fluid was not being utilized. It has been found that in the use of the cutter assembly and feeding devices of the aforesaid disclosure some proportion of water by-passed the center line or desired path of flow, i.e., certain amounts of fluid would be directed toward the exterior of the guides or positioners. The result, in such case, is to reduce the force of impact below that which it would be if all of the force of the hydraulic fluid were confined to the center line and to the interior of the guides or positioners. In such latter case it will then be appreciated that the full force, impact or available thrust of the propelling fluid is fully utilized. The instant improvement is thus directed to this particular facet of the novel arrangement of the Lamb-Davidson invention: confining the flow of the controlling fluid to limits within the positioners so that the full force thereof causes a sharp and precise impact to a greater degree upon the cutting arrangement which is positioned immediately after the positioner device, and without substantial by-pass of such carrier fluid to either side of the positioning or guide means.

It is accordingly a primary objective of the instant invention to provide a positioner-cutter assembly which, by controlling the flow of the employed hydraulic fluid to the center line by means inclusive of a resilient tubular element located interiorly of the positioners or guides, resultantly causes the full force or impact of the driving fluid to be exerted in a proper direction to the fullest extent, and without any substantial or perceptible by-pass of such fluid around the sides of either such tubular element or the described positioners or guides.

It is a further objective of the invention to provide a device of the described type which is inclusive of a rubber tubular element of novel design that, as stated, is positioned adjacent to but interiorly of the appropriate guide means. This tubular element, made of rubber or some other equivalent and resilient material, is provided with longitudinal and relatively close adjacent metallic wires or rods which extend throughout the length thereof. Such wires, built into the wall of such tubular element, permit the expansion thereof laterally or radially so as to accommodate variation in size of the product being handled, but prevent substantial linear or longitudinal elongation of the tubular element. Thus diameter size is compensated for, while at the same time each end of the element is closed off with respect to the exterior of the guide means, thus precluding, as before stated, the build up of fluid pressure exterior to such guide means and the confining of all available fluid pressure to the desired line of flow with consequent fullest use of the involved pressure.

Another object of the invention is the provision of a device of the identified category which, by means of the peculiar arrangement hereinafter more particularly described, permits the positioning of the cutter immediately adjacent the outby end of the positioning means and directly abutting the fluid outlet. In this respect the cutter is only a fraction of an inch from the discharge end of the positioning assembly so that the rapidly moving products, upon exit from the tubular element, immediately impinge upon the cutter with maximum force or impact. Such an arrangement further assures that the product does not waver from the center line, that the product is impacted against the cutter without loss of fluid pressure which might ordinarily be expelled to either side, and hence that the entire operation is more efficiently and more quickly performed.

Another objective of the invention is the provision of an improved form of positioner equalizing means. In this respect such positioners are made so as to be ideally responsive to any variation in size of the product, i.e., they are so mounted that they will immediately separate sufficiently to permit a larger than ordinary size potato from progressing therethrough, but will with equal speed and accuracy come together in equal and equivalent amount to accommodate a potato of lesser cross-sectional size. This is accomplished through an interlocking arrangement all dependent upon the movement of a single center or thrust bar and upon the reaction force of a single air cushion or spring bias assembly. This particular arrangement of the invention achieves immediate responsiveness of the guide means to variations in product size, thereby again, more efficiently utilizing the full effect of the fluid pressure carrying the product.

Other objectives and advantages of the instant invention will be apparent from consideration of the following more detailed description thereof wherein certain figures represent a preferred embodiment of the invention, and wherein:

FIGURE 1 is a side elevation view of the invention, partially in section, illustrating the relationship between one of the interconnected guide operating means and the pressure biased return mechanism;

FIGURE 2 is a top view of the invention as shown in FIGURE 1, partially in section, and illustrating the opposed positions of the two guide means as well as the linkage interconnecting each so as to permit equal separation and return thereof;

FIGURE 3 is a section view of the invention taken on the line 3—3 of FIGURE 1 illustrating particularly the manner by which the linkage system of the positioners are secured to the two top spacer bars, and showing such positioners, as well as the interiorly disposed rubber element, in relatively closed or unexpanded condition;

FIGURE 4 is a view similar to FIGURE 3 showing several potatoes entering the cutter assembly and impinging upon the cutter element, and hence, also showing the two guides or positioners as well as the rubber element in expanded condition;

FIGURE 5 is a section view taken on the line 5—5 of FIGURE 3;

FIGURE 6 is a section view taken on the line 6—6 of FIGURE 4;

Figures 7, 8:
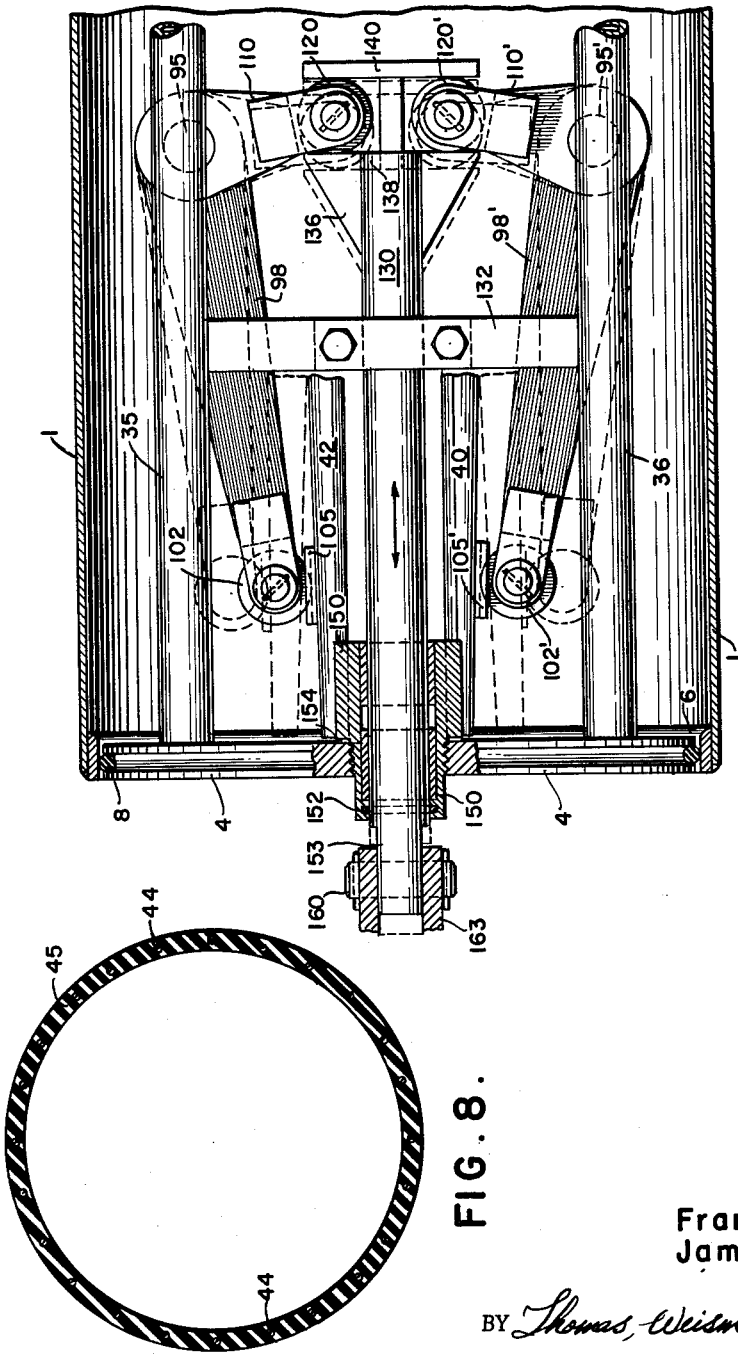

FIGURE 7 is a bottom plan view further showing the relationship of the linkage which controls equivalent and proportional outward or inward movement of the two guide or product positioner elements; and FIGURE 8 is an enlarged section view of the resilient tubular element particularly showing the relative positioning and spacing of a number of longitudinal wires embedded within the wall of such flexible element.

Referring more particularly to these drawings the described product guide mechanism is encased within a suitable cylindrical housing 1, closed off at each end by circular end plates 2 and 4 respectively. Each end of such housing is reinforced by an annular flange 5 and 6, the latter being welded to each respective end of the housing. The housing is affixed to the two end plates 2 and 4 in water-tight fashion, as by means of appropriate O-gaskets 7 and 8. Each of these fits in an appropriate annular groove in each of the end plates and each tightly bears against the respective end rings 5 and 6. The casing can be tightened in any suitable manner, or press fitted against such gaskets 7 and 8 so that, as indicated, the assembly thus far described is water-tight under conditions where rather high pressures are utilized to drive the product through the cutter mechanism.

The inby or inlet end of the housing is represented by the inlet tube or line 10 which progresses from the appropriate product separator as it is described in the referred to Lamb-Davidson disclosure. Such inlet line 10 is welded or otherwise suitably secured adjacent an appropriate opening 12 made in end plate 2. As will be seen, the product shown as entering in FIGURE 3, is ejected from the inlet tube 10 directly into a flexible tube positioned interiorly of the aligning or guide devices to be described.

The outlet for the centered product, aligned as a result of the guide assembly to be described, is represented by an appropriate opening 15 in the opposite end plate 4. The cutter mechanism 16 is mounted immediately adjacent to such opening 15 and disposed a matter of only a fraction of an inch, in the preferred embodiment of the invention, from the resilient tubular element and guide members so that the product upon discharge from the latter immediately and with great force impinges upon such cutter element. The cutter device itself may take any one of the forms as described in the Lamb-Davidson disclosure referred to above. As here shown the cutter therefore consists of certain of cutting blades 17 disposed, as depicted in FIGURE 3, in a lateral plane; cross cutter blades 18 are mounted at right angles thereto or in a vertical plane, as here shown. Slab cutters 19 on each side of this arrangement are adapted to remove the slab portions of the product here used as exemplary, a potato. On the other hand the referred to intermediate cutting elements 17 and 18 are adapted to slice the center cut portions longitudinally of the potato.

At any rate such cutter mechanism is mounted within a suitable cone-shaped housing 20 welded to the end plate 4 and having a configuration gradually increasing in diameter as it progresses from end plate 4 to the flange 21 by which it is connected through suitable bolts, etc., to the outlet line 24.

The type of separating mechanism, utilized to separate the center cuts from the slab portions of the product is similar to or may be the same as the separator more specifically disclosed in the referred to Lamb-Davidson disclosure. Hence by means of a concentric annular discharge tube 25 positioned within the respective housings 20 and 24, the slab portions of the potato are discharged through the annular channel 30 formed by the outside casings and the inner concentric tube 25. On the other hand, the center cut portions are discharged through the inner concentric chamber 32, to be separated from the slabs by such appropriate means as hereinbefore referred to.

The two opposed end plates 2 and 4 are further supported and separated by a series of longitudinally disposed and parallel spacer bars 35, 36, 37 and 38. The latter are welded to or threaded into each end plate in any appropriate fashion so that they lend additional rigidity to the entire structure. In addition and as will be seen, they form the necessary supports for the equalizing mechanism which assures uniformity of movement outwardly or inwardly of the two positioners or guides 40 and 42, movement of the latter accommodating differences in size of the product being handled.

In FIGURES 3 the referred to guides are indicated in their "closed" position, i.e., they have not been separated to any extent because no potato is progressing therethrough. In FIGURE 4, however, the two guides are indicated as being in their "open" position where they are pivoted outwardly by one or more of the products being carried by the hydraulic media toward the cutter assembly.

In any event, each guide preferably has the cross-sectional configuration as depicted in FIGURES 5 and 6. FIGURE 5 is representative of the inby end of each guide where the same are semi-circular in cross-sectional configuration; proceeding to the discharge end of the positioner assembly the semi-circular configuration is narrowed or the radius thereof diminished so as to approximate the configuration, in cross section, as seen in FIGURE 6. Here the top and bottom edges of each guide gradually form, proceeding from inby to outby end, vertically extending flanges such as indicated at 46.

A flexible or resilient tube 45, which essentially performs the sealing function, is likewise represented in these two figures in its normally closed position (FIGURE 3) or "open" or expanded position (FIGURE 4) when the product is progressing from inby to outby end of the unit. This flexible tubing 45 is sealed at one end to the inby plate member 2. The tubular element may be of any resilient material such as rubber, or like elastomer materials. Such rubber tube is smaller than the product (here the potato) but spreads as the potato goes through it. It can be fabricated of various sizes to accommodate appreciably different sizes of product. The guides or positioners which have been referred to above hold such tube in position so that its discharge end is always centered on the center of the knife head. What the rubber tube accomplishes that the referred to guides, used merely by themselves, do not accomplish is that very little, if any, water can go around the potato with consequent maximum thrust of the momentum of the product and particular hydraulic fluid being used as the carrier medium.

The referred to tubular element is provided with a series of metal wires or rods 44 (FIGURE 8) which run parallel with the length of the tube and which are imbedded in the wall of the tube. The end result of this is that the tube can expand in circumference but does not stretch in length. This permits the instant arrangement: the discharge end of the tube almost touches the knife head or cutter so that practically all of the hydraulic pressure is pushing on the potato even when the potato is a good way through the knife head.

Sealing of the tube at the inby end is accomplished as follows: such end is positioned over an intermediate ring gasket 48 by bending it around the latter in U-shaped fashion (FIGURES 3 and 4), the gasket then having a portion of the elastomer material of which the member 45 is made between the end plate 2 and an opposing compression plate 49. The latter is forced against the end plate 2 with the annular ring 48 and element 45 therebetween and fixed in this position by suitable bolts 52 which maintain the assembly in water-tight relationship with end plate 2.

In order to permit relative inward and outward movement in rapid succession as products are forced through this guide assembly each of the guides 40 and 42 is pivoted at the inby ends thereof, the pivotal movement thereof being indicated by comparison of the two positions of such guides as found in FIGURES 3 and 4. To accomplish this pivoting, suitable lugs 55 and 56 are welded to the referred to compression plate 49, each lug being provided with a suitable bore 55', 56' adapted to accommodate the pivot pins 58 and 59 respectively. Such pivot pins are provided with collars 58', 59', the latter supporting such pins when the terminal ends thereof are inserted in the referred to apertures 55', 56'.

Each of these pivot pins is fitted with a sleeve such as shown at 60 and 61, the interior bore of such sleeves being such that they freely ride upon the pivot pins.

The direct connection between each guide member and the rotatable sleeves just described takes the following form: lateral flanges 64 and 65 on guide 42, and the counterpart of the same on guide 40, lateral flanges 64' and 65' (FIGURES 3 and 4). These two sets of lateral flanges are spaced a distance, in each instance, equivalent to the outside diameter of the referred to sleeves 60 and 61 respectively and appropriately welded to each respective sleeve as will be understood by reference to these figures. Such pairs of lateral extensions as 64—65, 64'—65', are also interconnected by an additional plate 66 and 66' which is welded thereto. The sleeves in each case are maintained in position by appropriate washers 68 and surmounting cotter pin means 69 so that the entire assembly is maintained in the relative position shown, e.g., in FIGURE 5.

From the foregoing, it will be seen that this pivoting arrangement permits each of the guides 40 and 42 to pivot outwardly in an amount depending upon the relative size of the product as it progresses from inlet to outlet, and as controlled by a linkage system to be described.

There is a constant tendency of each of the guides to return to the position shown in FIGURE 3 by reason of inward pressure upon the outside of each guide member at its outby end. This is accomplished by the following mechanism.

At their opposite or outby ends each of the guide members 40 and 42 is provided with a sliding rest which permits outward and inward movement. This takes the form of brackets 75—75' (see FIGURE 6) affixed to the outby bottom end of each guide means, which brackets are provided with contacting slide buttons 76—76'. The latter are adapted to engage a table 78 along which each guide button 76—76' is permitted to slide that amount proportional with outward movement of the guides to the extent diagrammatically indicated in FIGURE 4. The referred to table 78 is directly welded to end plate 4, as same is shown in FIGURE 1.

The linkage which assures this same degree of inward or outward movement of the guides is directly connected in each instance to the adjacent spacer rods. Thus referring to FIGURE 3, a vertical flange or lug 80 is directly welded to the upper and lower rods 35 and 37. And likewise, the opposite flange 80' is welded to the two upper and lower spacer rods 36 and 38 respectively. Each of the parts of the linkage movements with respect to each guide member is identical although of course reversely positioned. At any rate, the vertical supports 80—80' are in turn interconnected with longitudinal flanges 84—84' (see FIGURES 1, 3 and 4) by means of bolts 85—85', suitable shims 86—86' being provided as so indicated. The plates 84—84', each disposed parallel to the adjacent spacer rods to which they are connected, are adapted to interconnect with the respective journals 90—90' in each instance (FIGURE 6). These journals, having intermediate bearing bushings 92 receive appropriate pins 95—95' which, at their upper ends, interconnect with two forked arms 98—98' disposed in the same horizontal plane. The respective yokes 100—100' of each of these forks are adapted to receive and engage in rotatable fashion rollers 102—102'. Each of the arms is splined or fixed against relative movement as by pins or set screws 99—99'.

In viewing FIGURE 6, it will be seen as thus far described, that each of these arms 98—98' is so disposed as to bring pressure to bear against the outer surfaces of the two opposed guides 40 and 42 by direct contact of the referred to rollers, so that upon separation of such guides this motion is imparted to such rollers and to the arms and yokes supporting the same. The rollers seat in appropriate depressions formed in lugs 105—105' positioned on each guide so as to perform this function. Such depressions maintain the rollers in the thrust position shown despite relative movement of the opposed yokes with respect to the guides. Hence it will be understood that with inward or outward movement of the guide rollers 102—102', the latter transmit such motion to the yokes and bearings 95—95' in a practically frictionless manner because of the roller seating arrangement provided on each side of the guide members.

Separation of the guide or positioning members is opposed by a resistance or predetermined amount of opposition to such movement so that on passage of the product through the guide members they tend to return to their original positions as indicated in FIGURE 3. This resistance to movement outwardly is achieved by a linkage that interconnects both of the pin members 95—95' with a suitable spring, air cushion or other bias means provided for this purpose.

In the instant case, this objective is obtained by providing similar and interconnected yoke members 110—110' upon the bottom of each of the referred to pins 95—95', such lower yokes being similarly affixed to such pins by set screws 115—115'. The result is that any outward movement of the guides is necessarily transmitted to the lower yoke members and conversely, any resistance to such movement is immediately transmitted from the lower yokes to the arms 98—98' and hence, through the rollers 102—102', to the respective positioners or guides.

These lower yoke members 110—110', disposed underneath the guide members as seen in FIGURE 6, are likewise provided with respective roller means 120—120', the latter being journaled upon suitable bearing pins 122—122' respectively which are maintained in the position by any usual means, as cross pins, etc.

Such rollers are directly connected to a common fulcrum point or operate in direct response to not only guide movement outwardly but also to forces imposed upon a common thrust rod 130. Such thrust rod (see FIGURES 6 and 7) is slidably journaled for reciprocating movement in an appropriate bearing 135 which provides its main support and which in turn is maintained in the position shown by means of a cross brace 132, the latter being welded to the oppositely disposed spacer bars 37 and 38.

Viewing FIGURE 7, it is seen that the linkage end of such thrust rod 130 is provided with a lateral flange 136 which supports two parallel spaced members 138 and 140 of U-shape disposed apart a sufficient distance to accommodate in slidable relationship the rollers described above, that is, rollers 120—120'. When positioned as shown and as viewed in this figure movement of such rollers to right or left will cause, and with practically no friction because of such roller engagement, corresponding movement right to left of the thrust bar 130, as indicated by the arrow in that figure. Similarly, the thrust imposed by thrust rod 130 will tend to be imposed upon the rollers and the other elements of the described linkage in the same manner. Hence the entire movement of the two positioners or guides is inter-related, dependent and correlated so that such guides will move inwardly or outwardly at equal and proportional distances whether or not a slightly greater pressure is placed against one of such guides than the pressure exerted upon the other. Hence the centering function of this assembly is assured.

Besides being supported in the journal 135, the thrust rod 130 is likewise supported at its opposite end by a journal 150 which permits it to extend outside of the guide assembly, yet maintains the latter in water-tight relationship with respect to the exterior of the unit. This is accomplished by the said journal bushing 150 which is threaded as indicated in FIGURE 7 for threaded engagement through the end wall 4 of the housing. A sleeve bearing 151 directly engages the push rod 130. The journal bushing 150 is rendered water-tight by compression seal 154, and sleeve 151 provided with seal 152 for the same purpose.

The extending portion 153 of the thrust rod 130 (i.e., exterior to the positioner housing) is interconnected, by means of a suitable pin 160 to the fork 163 of a triangular cam plate 165. The pivot point of this cam is represented by the axis of a roller 168 supported on the lower triangular edge of the cam by a pin 170. The roller 168 is supported in between two parallel surfaces represented by the inside edge of lug 172 and bearing surface 175 attached to a flange 180 which in turn is suitably welded or otherwise affixed to the end plate 4.

The lug 172 is also supported upon an additional flange member 183 disposed at right angles to the flange 180 and affixed thereto, as shown in FIGURE 1.

The third point of the triangular cam is pivoted as by pivot pin 185 to the diaphragm rod 188 of a known type of air brake diaphragm 190. The air brake diaphragm is supported upon the same bracket element 183 referred to above. Such mechanism simply utilizes the air pressure on one side of a sealed diaphragm to induce a spring bias, i.e., to resist movement causing compression of the contained air, which air pressure induces or tends toward counter movement when the applied force is relieved. It is of course obvious that other expedients to create counter pressure against outward movement of the guide members may be utilized, such as a spring means of predetermined bias.

From the foregoing explanation the operation of this type of product feeding and centering mechanism should be well understood. The unextended or collapsed position of the resilient tubular element 45 as well as the two side positioners 40 and 42 are indicated in FIGURE 3. This is before entrance into the assembly of the first of a series of, for example, potatoes which are forced through the cutter due to the thrust of the involved hydraulic fluid as well as the speed or momentum of the product carried by such fluid. As each potato nears the cutter the inner tubular member 45 is of course distended to the position shown in FIGURE 4. This outer movement or expansion of the inner tubular element causes a corresponding amount of movement of the positioners as the product nears the outby end of the mechanism and impinges upon the cutter element. Through the linkage which has been described above such movement is reflected by outer movement of the upper arms 98—98', corresponding movement of the lower forks and rollers 120—120' and hence, a proportionate amount of movement of the thrust rod 130 in a direction toward the outby end of the mechanism or to the left viewing FIGURE 7. Such movement is further reflected by the compression of the diaphragm rod 188 downwardly (FIGURE 1). In other words, this outward extension of the two guides 40 and 42 is accompanied by a downward thrust of the diaphragm rod and corresponding movement of the triangular cam plate. As seen in FIGURE 1 such corresponding movement is indicated in dotted line. As the pressure upon the tubular element 45 is released the compressed air in the sealed side of the air brake diaphragm causes counter movement of push rod 188 back to its original position (in solid line in FIGURE 1) and related corresponding movements of the same coordinated elements back to the position indicated in FIGURE 3.

It is thus seen that by this linkage system between the two positioner plates 40 and 42 each are caused to move a like amount with respect to outward or inward progression and responsive to any expansion of the inner and resilient tubular member 45. Thus at all times the product is exactly and neatly centered along the longitudinal axis of the unit so that its full impact force is directed to the exact center of the cutter itself.

It will be noted that whereas the inby end of the resilient tubular element 45 is sealed against water entry the outby end thereof is open and unsealed. The guide members, as before indicated, maintain the centering of such element 45 at all stages of operation such as that depicted in FIGURE 3 where the potato has not yet entered the unit. Such outby end, although not positively sealed to the opening 15 of the end wall 4, is nevertheless placed in immediate proximity to that opening. Water is carried through the unit at a great rate of speed and such fluid as may escape to the portion of the cylindrical housing 1 exterior to the guides is of little significance for this reason: should such water rise to a level near to the opening 15 it will be picked up and transmitted through either of the passageways 30 or 32 adjacent to the water. This is because the hydraulic fluid, at the rates of speed here contemplated, is such as to cause the tube 45 to operate as would a venturi—any excess water adjacent the opening 15 will be picked up by such "jetting" action of the water and forced into one or the other of the discharging passageways.

It is thus to be observed that the interior of the cylindrical housing 1, with the exception of the water that is forced to flow through tubular element 45 is at all times kept substantially clear of any significant amount of water. Hence the guides and the related elements which control same are not affected by the presence of water in or around same and become, as a consequence, much more responsive to any pressures or change of pressures within the interior of the tubular element 45.

The system as herein proposed thus achieves the primary objective referred to above—that of utilization of all of the potential force exerted by the hydraulic fluid used as propulsion for the product and as a means of neatly slicing the product upon an appropriate cutter element. As a result the operation is more efficient than any heretofore known and, in providing for sensitive responsive means which promptly and immediately reflect any movement of the guide elements, the centering function is likewise more efficiently performed.

While there is herein shown and described the preferred embodiment of the invention, it is nevertheless to be understood that various changes may be made with respect thereto without departing from the principle and scope of the invention as measured by the claims appended hereto.

We claim:

1. In a mechanism for the cutting of food products into predetermined sizes having a fluid tight cutter assembly casing provided with a cutter means and fluid pressure means at one end thereof to force said products against said cutter means, the improvement comprising a product centering means positioned anterior to said cutter means, said centering means including a tube of resilient material affixed to said one end in fluid tight relationship therewith and extending to a point adjacent said cutter means, opposed guide means on each side of said tube, a guide means linkage, each of said guide means on one side of said tube being linked by said linkage to its respective opposed guide means to effectuate equal outward and inward movement thereof responsive to the sizes of said products, said tube confining fluid flow therein, whereby the full force of said fluid pressure is exerted against said products and not permitted to by-pass to the space exterior of said guide means.

2. The combination as defined in claim 1 wherein said opposed guide means are pivoted for outward and inward movement near said one end and are supported near the other end of said tube by said guide means linkage.

3. The combination as defined in claim 1 wherein said guide means linkage includes a common thrust rod, said thrust rod having a spring bias tending to force said guide means toward each other and to oppose outward movement thereof.

4. The combination as defined in claim 3 wherein said spring bias is an air brake diaphragm having a power arm linked to said thrust rod, said power rod having a predetermined resistance to movement permitting said guides to move outwardly to accommodate those products of relatively large size, said air brake diaphragm causing said guides to close toward each other to accommodate products of relatively small size.

5. The invention as defined in claim 1 wherein the wall of said tube of resilient material is provided with spaced, longitudinal wires throughout the length thereof whereby said tube may be expanded substantially in a radial direction, but longitudinal expansion is substantially restricted and prevented.

6. In an assembly for the cutting of food products into predetermined sizes by means of fluid pressure and having a fluid tight cutter assembly casing provided with a product cutter means, fluid pressure and product separating means at one end thereof to separate and force said products against said cutter means, a product centering means positioned anterior to said cutter means, said centering means including a tube of resilient material affixed to said one end in fluid tight relationship therewith and extending to a point adjacent said cutter means, opposed guide means on each side of said tube, said guide means supporting said tube at the other end thereof, each of said guide means on one side of said tube being linked to its respective opposed guide means to effectuate equalized outward and inward movement thereof responsive to the sizes of said products, opposed spacer rods positioned between the respective ends of said casing, each of said guide means being mounted on one of said spacer rods, a longitudinal thrust rod disposed for reciprocal movement, each of said guide means being linked to said thrust rod to reflect movement thereof, said thrust rod being provided with spring bias to resist outward movement of said guides, whereby said fluid pressure is centered within said tube and said products are directed against said cutter means without by-pass of said fluid, and said guides are responsive to variations in product size.

7. The invention as defined in claim 5 wherein said spring bias comprises an air brake diaphragm.

8. The invention as defined in claim 5 wherein the wall of said tube of resilient material is provided with metallic elements extending the length thereof whereby said tube may be expanded radially but longitudinal extension thereof is substantially prevented.

9. In an hydraulic feed mechanism for food products wherein fluid under pressure transports and forces said products against a product cutter, means to guide said products to said cutter and to substantially prevent by-pass of fluid exterior to the path of flow of said products, said means comprising a guide casing having a fluid-product inlet and a fluid-product outlet, an expansible tube of a diameter less than the product diameter, said tube at one end thereof being affixed around said inlet in water-tight fashion, centering guides adjacent said outlet supporting said tube at the opposite end thereof, a cutter adjacent said opposite end, and bias means in association with said centering guides to constantly urge said guides toward the center line of said tube, whereby said fluid is constantly centered toward said cutter and by-pass of fluid around said cutter is substantially prevented.

10. In an hydraulic feed mechanism for food products wherein fluid under pressure transports and forces said products against a product cutter, means to guide said products to said cutter and to prevent by-pass of fluid exterior to the path of flow of said products, said means comprising a guide casing having a fluid-product inlet and a fluid-product outlet, means to force product carrying fluid through said guide casing, an expansible tube of a diameter less than the product diameter disposed along the longitudinal center axis of said casing, said tube at one end thereof being affixed around said inlet in water-tight fashion, opposing centering guides adjacent said outlet supporting said tube at the opposite end thereof, a cutter adjacent said opposite end, and bias means in association with each of said centering means to constantly urge said guides toward the center line of said tube, said guides being interlocked with each other to equalize any outward and inward movement thereof, whereby said fluid is constantly centered toward said cutter and by-pass of fluid around said cutter is substantially prevented.

11. In an hydraulic feed mechanism for food products wherein fluid under pressure transports and forces said products against a product cutter, means to guide said products to said cutter and to prevent by-pass of fluid exterior to the path of flow of said products, said means comprising a guide casing having a fluid-product inlet and a fluid-product outlet, an expansible tube of a diameter less than the product diameter, said tube at one end thereof being affixed around said inlet in water-tight fashion, the wall of said tube having longitudinal metallic elements therein permitting radial expansion but preventing longitudinal expansion thereof, centering guides adjacent said outlet supporting said tube at the opposite end thereof, a cutter adjacent said opposite end, and bias means in association with said centering means to constantly urge said guides toward the center line of said tube, whereby said fluid is constantly centered toward said cutter, by-pass of fluid around said cutter is substantially prevented, and said tube accommodates products of varied sizes.

12. The combination as defined in claim 11 wherein said bias means comprises an air brake diaphragm and said guides are pivoted for movement with respect to said tube near said fluid-product inlet.

13. In an hydraulic feed mechanism for food products, a product cutter, means to guide said products to said cutter and to substantially prevent by-pass of fluid exterior to the path of flow of said products, said means comprising a guide casing having a fluid-product inlet and a fluid-product outlet, an expansible tube of a diameter less than the product diameter, said tube at one end thereof being affixed around said inlet in water tight fashion, centering means adjacent said outlet supporting said tube at the opposite end thereof, said product cutter being disposed adjacent said outlet, said centering means including a bias means to constantly urge said tube toward the longitudinal center line of said guide casing, whereby said fluid is constantly centered with respect to said center line and directed toward said cutter and by-pass of fluid around said cutter is substantially prevented.

No references cited.